WILLIAM YOUNG.

Hot Air Register.

Reissued Feb. 27, 1872.

No. 4,773.

Witnesses:
John Becker.
Geo. W. Mabee

Inventor:
Wm. Young
PER Munn & Co
Attorneys.

AM. PHOTO-LITHOGRAPHIC CO. N.Y. (OSBORNE'S PROCESS.)

UNITED STATES PATENT OFFICE.

WILLIAM YOUNG, OF EASTON, PENNSYLVANIA, ASSIGNOR TO THE TUTTLE AND BAILEY MANUFACTURING COMPANY, OF NEW YORK CITY.

IMPROVEMENT IN HOT-AIR REGISTERS.

Specification forming part of Letters Patent No. 114,247, dated April 25, 1871; reissue No. 4,773, dated February 27, 1872.

Specification describing a new and useful Improvement in Hot-Air Registers, invented by WILLIAM YOUNG, of Easton, in the county of Northampton and State of Pennsylvania.

This invention relates to improvement in registers for admitting hot air through the walls of buildings; and consists in constructing the device of a frame having a detachable rim provided with a hinged face-plate, in which the register-valves are pivoted, this rim and its face-plate being adapted for employment with or without the frame, while the face-plate may in turn be used without the detachable rim, all as hereinafter more fully set forth.

Figure 1:
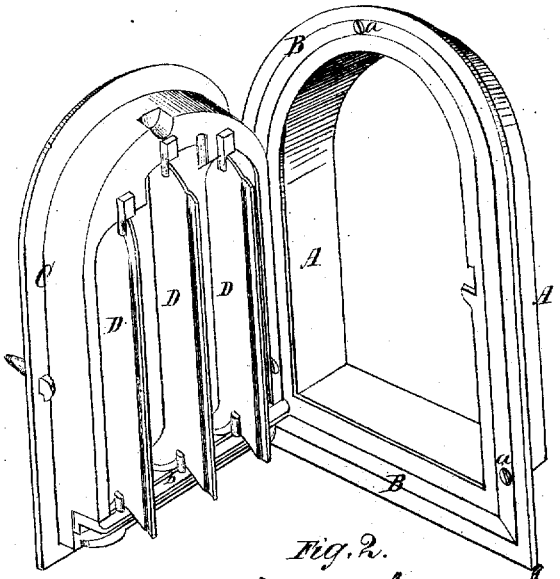
Figure 2:
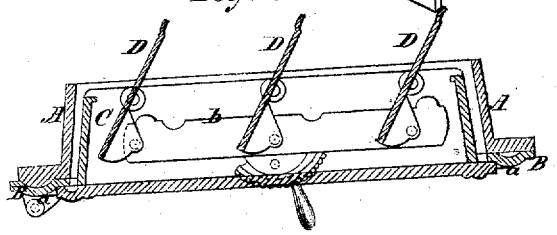

In the accompanying drawing, Figure 1 is a perspective view of the register, open. Fig. 2 is a horizontal section of the same.

Similar letters of reference indicate corresponding parts.

A is frame, of cast-iron or other metal, of suitable dimension, which is built in or placed in the wall or chimney where the register is intended to be placed. This frame is provided with suitable lugs or projections for the insertion of screws *a a*, by which the rim B is secured. This rim covers the front edge of the frame, and laps over onto the wall, as seen in Fig. 2, so as to cover the joint between the frame and masonry, and it must, of course, be attached after the frame has been fixed in the wall and the wall finished. The rim B is provided on one side with hinges for attaching the register-face C, which face is made of the usual open-work for the passage of heated air. On the inner side of the face C are pivoted the vertical register-valves D D, the lower journals or pivots of which have their bearings in a sliding bar, *b*, said bar being operated from the front to open and close the valves at will. The rim B may be attached directly to the wall, so that the frame A may be dispensed with, and hooks or hinges may be fastened directly to the wall, so that the rim B may be dispensed with.

I do not, therefore, confine myself to the precise form or arrangement of the parts shown and described, as they may be varied in many ways without departing from my invention. The face C being hinged, it can be opened for the purpose of cleaning the register or flue, or to allow all the heat to enter the room.

Having thus described my invention, I claim as new and desire to secure by Letters Patent—

A hot-air register, composed of the frame A, detachable rim B, with hinged face-plate C and register-valves D, substantially as shown and described.

WILLIAM YOUNG.

Witnesses:
NELSON HOYT,
S. MOORE.